US012327292B2

(12) United States Patent
Zimmerman et al.

(10) Patent No.: US 12,327,292 B2
(45) Date of Patent: Jun. 10, 2025

(54) SYSTEMS AND METHODS FOR SEARCHING REMOTE DATABASES

(71) Applicant: THOMSON REUTERS ENTERPRISE CENTRE GMBH, Zug (CH)

(72) Inventors: Kevin J. Zimmerman, Alameda, CA (US); Jason A. Thomas, Arlington, VA (US); Daniel Bennett, Rosemount, MN (US); Robert J. Schukai, Marietta, GA (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 799 days.

(21) Appl. No.: 14/561,729

(22) Filed: Dec. 5, 2014

(65) Prior Publication Data

US 2016/0163011 A1    Jun. 9, 2016

(51) Int. Cl.
| | | |
|---|---|---|
| *G06F 16/00* | (2019.01) | |
| *G06F 16/22* | (2019.01) | |
| *G06F 16/242* | (2019.01) | |
| *G06F 16/2452* | (2019.01) | |
| *G06F 16/2455* | (2019.01) | |
| *G06F 16/2457* | (2019.01) | |
| *G06F 16/248* | (2019.01) | |
| *G06F 16/334* | (2025.01) | |
| *G06F 16/9538* | (2019.01) | |
| *G06Q 50/26* | (2012.01) | |

(52) U.S. Cl.
CPC ....... *G06Q 50/265* (2013.01); *G06F 16/2246* (2019.01); *G06F 16/2272* (2019.01); *G06F 16/242* (2019.01); *G06F 16/24522* (2019.01); *G06F 16/24553* (2019.01); *G06F 16/24575* (2019.01); *G06F 16/248* (2019.01); *G06F 16/3346* (2019.01); *G06F 16/9538* (2019.01)

(58) Field of Classification Search
CPC ............ G06Q 50/265; G06F 17/30389; G06F 17/30528; G06F 17/30554; G06F 16/248; G06F 16/24575; G06F 16/242; G06F 16/3346; G06F 16/2246; G06F 16/2272; G06F 16/9538; G06F 16/24522; G06F 16/24553
USPC ........................................ 707/783
See application file for complete search history.

(56) References Cited

U.S. PATENT DOCUMENTS

| | | | | |
|---|---|---|---|---|
| 5,263,118 A | * | 11/1993 | Cornelison | ............... G06F 3/16 704/200 |
| 2004/0213437 A1 | * | 10/2004 | Howard | ............ G06F 17/30011 382/115 |
| 2008/0002916 A1 | * | 1/2008 | Vincent | ................ G06K 9/3258 382/305 |

(Continued)

*Primary Examiner* — Srirama Channavajjala
(74) *Attorney, Agent, or Firm* — Nikitas E. Nicolakis; Lombard Geliebter Cohen LLP

(57) ABSTRACT

The present disclosure is directed towards systems and methods for performing an on-line database search, which comprises receiving a personal device request signal from a personal device. In response to receipt of the personal device request signal, a first piece of information from a first public records database is identified and a second piece of information from a second public records database is identified. A report is generated associated with the first piece of information and the second piece of information. A report signal associated with the report is then transmitted to the personal device.

18 Claims, 12 Drawing Sheets

(56) References Cited

U.S. PATENT DOCUMENTS

| | | | |
|---|---|---|---|
| 2011/0025842 A1* | 2/2011 | King | H04N 1/0036 |
| | | | 348/135 |
| 2014/0270383 A1* | 9/2014 | Pederson | G08G 1/04 |
| | | | 382/104 |
| 2014/0344238 A1* | 11/2014 | Rathus | G06F 16/532 |
| | | | 707/706 |
| 2014/0347265 A1* | 11/2014 | Aimone | G09G 3/003 |
| | | | 345/156 |
| 2016/0328021 A1* | 11/2016 | Lee | G06F 3/0304 |

* cited by examiner

SYSTEMS AND METHODS FOR SEARCHING REMOTE DATABASES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright © 2014 Thomson Reuters.

TECHNICAL FIELD

This disclosure relates generally to database searching. More specifically, the disclosure is directed towards systems and methods for searching databases using visual and audio inputs through a personal device.

BACKGROUND

Law enforcement is without question a necessary activity in our communities that unfortunately can be dangerous. Law enforcement officers often describe how split second decisions can be the difference between life and death. Making those split second decision, of course, requires information and the quicker a law enforcement office can acquire information, the sounder a decision he or she can make. In an effort to provide law enforcement officers with necessary information as quickly as possible, law enforcement agencies continuously implement modern technologies as part their training and field activities, such as wireless radios or remote computers installed in the law enforcement vehicles. However, with the recent advent of mobile device technology, and specifically, with personal wearable device technology, an opportunity now exists to implement technologies that will utilize such devices in order to search and locate information and assist law enforcement personnel in obtaining the necessary information, without the wasted time and effort of manually entering search information in vehicle installed computer or using antiquated technologies, such as low range radios.

SUMMARY

The present disclosure is directed towards systems and methods for performing an on-line database search using a personal device. In one aspect, the computer implemented method includes receiving a personal device request signal from a personal device and in response to receipt of the personal device request signal, identifying a first piece of information from a first public records database and a second piece of information from a second public records database. A report associated with the first piece of information and the second piece of information is then generated and a report signal associated with the report; is stored and transmitted to the personal device.

According to one embodiment, the personal device request signal comprises at least one of audio information, visual information and textual information. According to another embodiment, the personal device request signal is generated by an interaction between a law enforcement person and the personal device, wherein the personal device is a wearable personal device and the interaction is at least one of a visual interaction, an audio interaction and textual information. The wearable personal device, according to one embodiment, may include eyewear or comprises a microphone or an image capture and process system, or any combination thereof.

According to another embodiment, the first piece of information and second piece of information relates to a first person and the report associated with the first piece of information and the second piece of information comprises a determination that the first person is a person of interest. In another embodiment, the first piece of information relates to a first person and the and second piece of information relates to a second person and the report associated with the first piece of information and the second piece of information comprises a determination that the first person is a person of interest.

A system, as well as articles that include a machine-readable medium storing machine-readable program code for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

Figure 1:
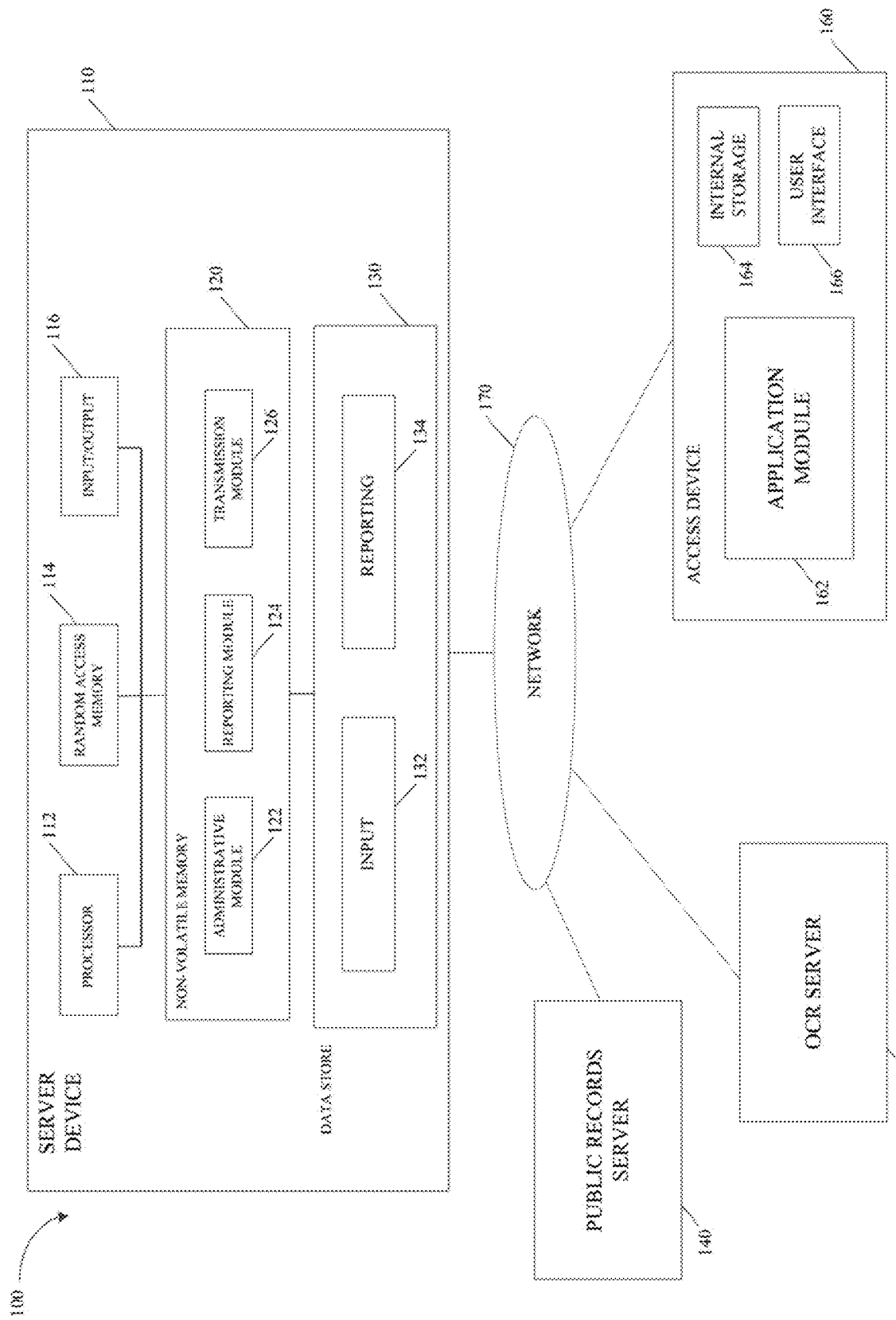
FIG. 1 is a schematic depicting an exemplary computer-based system for database searching.

Turning now to FIG. 1, an example of a suitable computing system 100 within which embodiments of the disclosure may be implemented is presented. The computing system 100 is only one example and is not intended to suggest any limitation as to the scope of use or functionality of the disclosure. Neither should the computing system 100 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, etc. that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 1, the system 100 includes a server device 110 configured to include a processor 112, such as a central processing unit ("CPU"), random access memory ("RAM") 114, one or more input-output devices 116, such as a display device (not shown) and keyboard (not shown), non-volatile memory 120 and data store 130, all of which are interconnected via a common bus and controlled by the processor 112.

As shown in the FIG. 1 example, in one embodiment, the non-volatile memory 120 is configured to include an administration module 122, a reporting module 124 and a transmission module 126. The administrative module 122 is configured to generate and install one or more applications on access device 160, as well as transmit visual information to the OCR server 150 for image processing. According to one embodiment, the administrative module 122 is operative to and performs one or more searches of one or more public records databases of a public records server 140 based on a received personal device request signal in the form of visual information, audio information or textual information, or any combination thereof, as well as identifies relevant information within each of the one more public records databases pertaining to an individual or entity. According to another embodiment, the administrative module 122 serves to transmit the personal device request signal in the form of visual information, audio information or textual information, or any combination thereof, to the public records server 140, which in turn searches its one or more public records databases in order to identify relevant information pertaining to an individual or entity.

According to one embodiment, the reporting module 124 is configured to receive multiple pieces of relevant information pertaining to an individual or entity from administrative module 122 and generate a report associated with the multiple pieces of information. In another embodiment, the reporting module 124 is receives the relevant information from the public records server 140 over the network 170. The transmission module 126 is configured serve as a gateway form for the server 110 and is operative to receive the personal device request signal from a personal device, transmit the personal device request signal and search requests based thereon to and receive relevant information from an OCR server 150 and the public records server 140, and transmit the generated report associated with the multiple pieces of information back to the requesting personal device. Additional details of modules 122, 124 and 126 are discussed in connection with FIGS. 2-12.

As shown in FIG. 1, in one embodiment, a network 170 is provided that can include various devices such as routers, server, and switching elements connected in an Intranet, Extranet or Internet configuration. In one embodiment, the network 170 employs wireless communication protocols to transfer information between an access device 160, the server device 110, a data store 130, a public records server 140 and an OCR server 150. For example, the network 170 may be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 170 may also be a Wide Area Network (WAN), such as the Internet, which employs one or more transmission protocols, e.g. TCP/IP. As another example, the network 170 may employ a combination of digital cellular standards and transmission protocols. In another embodiment, the network 170 uses wired communications to transfer information between the access device 160, the server device 110, the data store 130, the public records server 140 and the OCR server 150. In yet other embodiments, the network 170 may employ a combination of wired and wireless technologies to transfer information between the access device 160, the server device 110, the data store 130, the public records server 140 and the OCR server 150.

The data store 130 is a repository that maintains and stores information utilized by the before-mentioned modules 122, 124 and 126. In one embodiment, the data store 130 is a relational data store. In another embodiment, the data store 130 is a directory server, such as a Lightweight Directory Access Protocol ("LDAP"). In yet another embodiment, the data store 130 is an area of non-volatile memory 120 of the server device 110.

In one embodiment, as shown in the FIG. 1 example, the data store 130 includes an input data store 132 and a reporting data store 134. According to one embodiment, the input data store 132 is operative to store the received personal device request signal from the transmission module 126, which can be in the form of audio information, visual informational and textual information. The input data store 132, in one embodiment, is further configured to store maintain optical character recognition data processed from visual information by the OCR server 150. According to one embodiment, the reporting data store 134 stores the multiple pieces of relevant information identified from the multiple databases of the public records server 140, as well as the reports associated with the multiple pieces of information generated by the reporting module 124.

Although the data store 130 shown in FIG. 1 is shown as part of the server device 110, it will be appreciated by one skilled in the art that the data store 130 and/or any of the information shown therein, can be distributed across various servers and be accessible to the server device 110 over the network 170, be coupled directly to the server device 110, or be configured in an area of non-volatile memory 120 of the server device 110.

The access device 160, according to one embodiment, is a personal device, such as a personal wearable device, including but not limited to computing eyewear, such as GOOGLE™ GLASS™ wearable computing device, and wrist wearable computing device, such as ANDROID™ WEAR wearable computing device or APPLE WATCH™ wearable computing device. According to another embodiment, the personal device is a smartphone, tablet device or other personal digital assistant device. According to one embodiment, the access device 160 has user interface 166, an application module 162 and an internal storage component 164. Additionally, according to one embodiment, the access device 160 may have a plurality of sensors (not shown), an external storage component (not shown), a power management system (not shown), an audio component (not shown), audio input/output components (not shown), an image capture and process system (not shown), RF antenna (not shown) and a subscriber identification module (SIM) (not shown). The internal storage component 164 may include, for example, static random-access memory (SRAM) or Flash memory components. According to another embodiment, the access device 160, is a wearable general purpose or special purpose computing device comprising the user interface 166, the application module 162, a plurality of sensors (not shown), a processor (not shown), transient and persistent storage devices (not shown), input/output subsystem (not shown), bus to provide a communications path between components comprising the general purpose or special purpose computer, and a web-based client application, such as a web browser, which allows a user to access the data stored within data store 130. Examples of web browsers are known in the art, such as MICROSOFT® INTERNET EXPLORER®, GOOGLE CHROME™, MOZILLA FIREFOX® AND APPLE®, SAFARI®. According to another embodiment, the access device 160 may comprise a plurality of access devices, each of which comprise the same exemplary components as described herein.

The application module 162, according to one embodiment, is configured to execute an application, which is rendered to a user on the user interface 166 of the access device 160. The application, according to one embodiment, is executed via the application module 162 and rendered on the user interface 166 when execution of the application is initiated. Execution of the application and rendering on a user interface are well known in the art. According to one one embodiment, the application is written in one or more programming languages commonly used for mobile application programming development in mobile operating systems, including but not limited to JAVA, C, C++, HTML, JavaScript, and Objective C using the appropriate Software Development Kit ("SDK") for the corresponding mobile operating system, such as the SDKs for Apple® IOS®, ANDROID™ and GLASS™.

According to one embodiment, the public records server 140 is a general purpose or special purpose computing device comprising a user interface, an application module, transient and persistent storage devices, input/output subsystem and bus to provide a communications path between components comprising the general purpose or special purpose computer. According to one embodiment, the public records server 140 comprises one or more public records databases containing public records pertaining to individuals and entities. For example, the public records server 140 may comprise a server, storage media and other associated hardware to support the THOMSON REUTERS CLEAR® records database product, which includes a collection of public and proprietary records databases comprising such information as extensive cell phone and work affiliations data, data from social networks, blogs, news and watch lists.

According to one embodiment, the OCR server 150 is a general purpose or special purpose computing device comprising a user interface, an application module, transient and persistent storage devices, input/output subsystem and bus to provide a communications path between components comprising the general purpose or special purpose computer. In one embodiment, the OCR server 150 performs optical character recognition ("OCR") processing on visual data, such as video data or still photographs received from the access device 160 via the server device 110 and provides OCR processing results to the server device 110. OCR processing is well known in the art and applications of such OCR processing includes for example, identifying a textual portion of a vehicle license plate and generating a result comprising the text of the vehicle license plate. Additional details of OCR processing as it relates to the present invention are discussed in connection with FIGS. 2-8.

Further, it should be noted that the system 100 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 2:
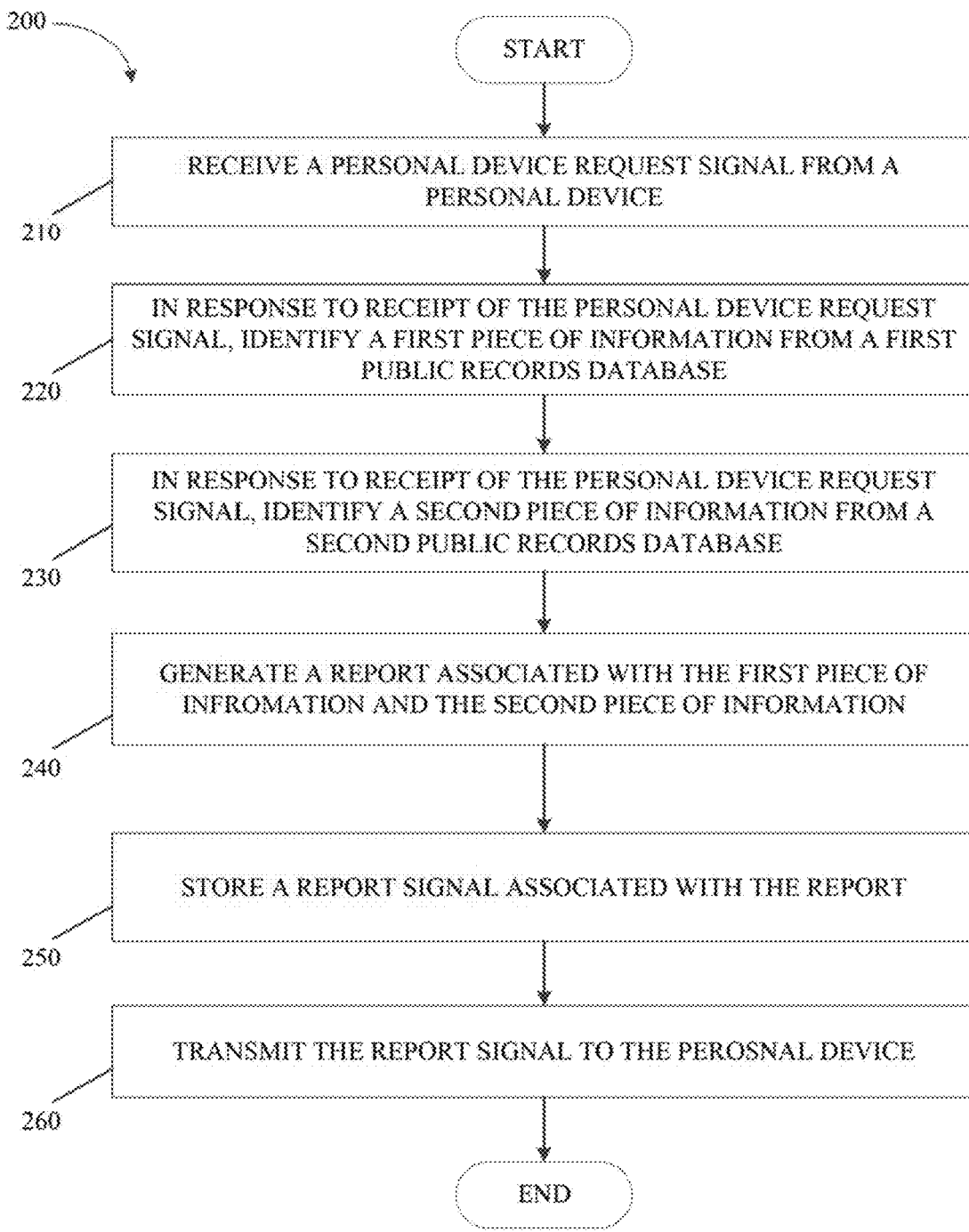
FIG. 2 is a flow diagram illustrating an exemplary computer-implemented method for database searching.

Turning now to FIG. 2, an exemplary method 200 for performing an on-line database search is disclosed. In the exemplary embodiment illustrated in FIG. 2, a personal device request signal is generated by the access device 160 and is received by the transmission module 126 of the server device 110, step 210. As discussed previously, the access device 160, according to one embodiment, is a personal device, such as a personal wearable device, including but not limited to computing eyewear, such as GOOGLE™ GLASS™ wearable computing device, and wrist wearable computing device, such as ANDROID™ WEAR wearable computing device or APPLE WATCH™ wearable computing device. According to one embodiment, prior to the access device 160 generating a personal request signal, an application installed within the internal storage 164 of the access device 160 is executed through a user interaction of the application module 162. As discussed previously, the application module 162, according to one embodiment, is configured to execute the application, which is rendered on the user interface 166 of the access device 160.

Figure 3:
FIG. 3 is an illustration of an exemplary graphical user interface for public records database searching using a visual input through a mobile device.

In one example, the application is made available on a personal wearable device, such as GOOGLE GLASS™, and is initiated by a user, such as a law enforcement officer, through one or more voice commands, depression of one or more physical buttons or keys, or combination thereof. Upon the user initiating execution of the application, a graphical rendering is presented on the user interface 166, in this case the lenses of the personal computing eyewear and is presented to the user. FIG. 3 is an exemplary initial graphical rendering whereby graphical rendering 300 is presented to a user and the activity of searching a vehicle license plate, presented as "run a plate" 302 is made available, which could be accomplished by a voice input 304 or by an image input 306. A law enforcement officer may, for example, be presented with graphical rendering 300 after powering his personal computing eyewear device and initiating an application to search a vehicle license plate through a series of voice commands.

Figure 4:
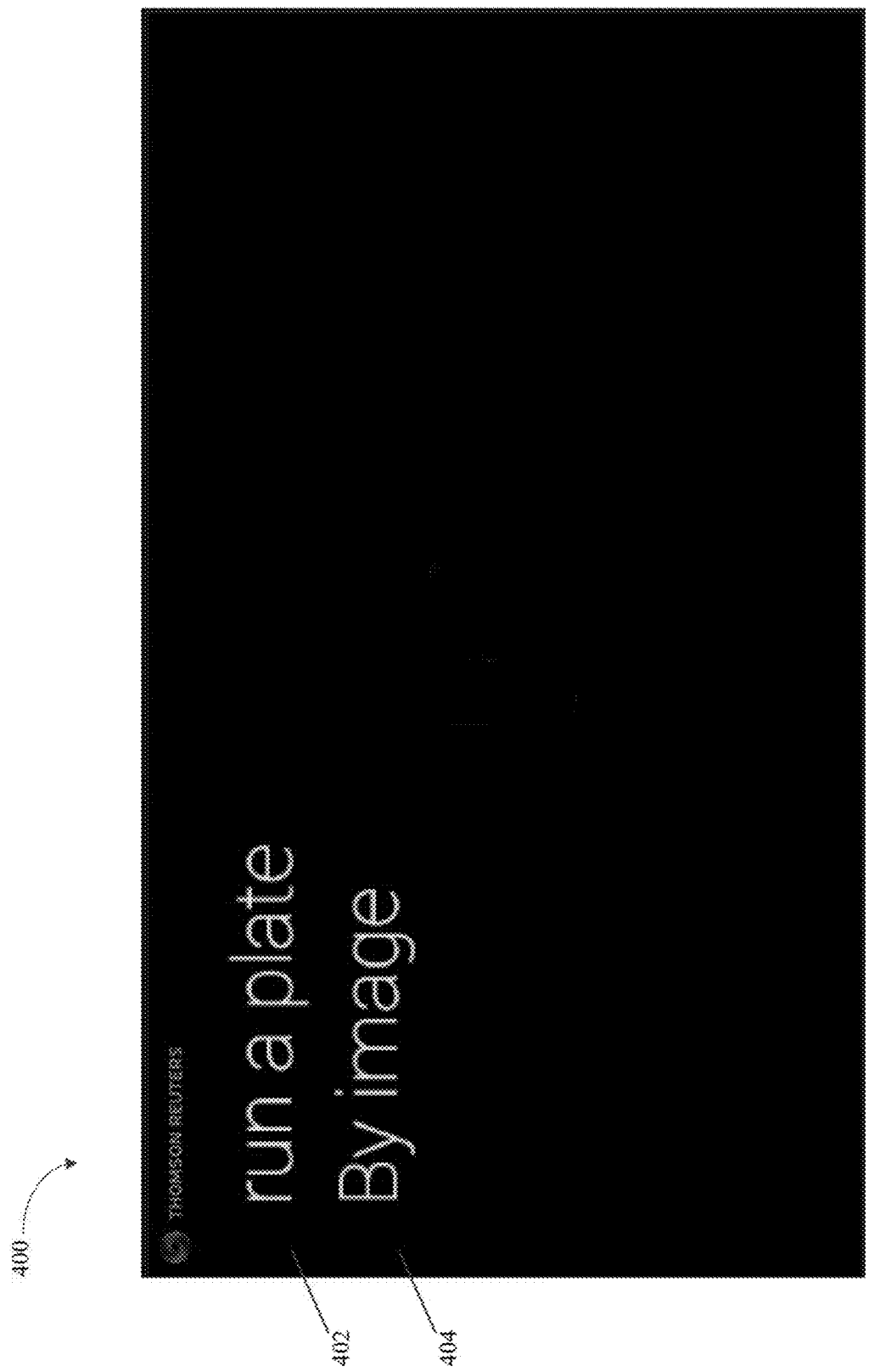
FIG. 4 is an illustration of another exemplary graphical user interface for public records database searching using a visual input through a mobile device.

FIG. 4 presents an exemplary graphical rendering 400, in one embodiment, whereby the user elects to "run a plate" 402 by providing visual input through an image 404. According to one embodiment, the access device 160 comprises an image capture and process system operative to capture video and still images at the instruction of the application module 162 which received the user selection "by image" 404 through one or more voice commands, depression of one or more physical buttons or keys, or combination thereof. For example, the application having been initiated on the law enforcement officer's personal computing eyewear device and instructed to "run a plate" by an image input, will utilize its incorporated camera device to capture an image of a vehicle's license plate.

Figure 5:
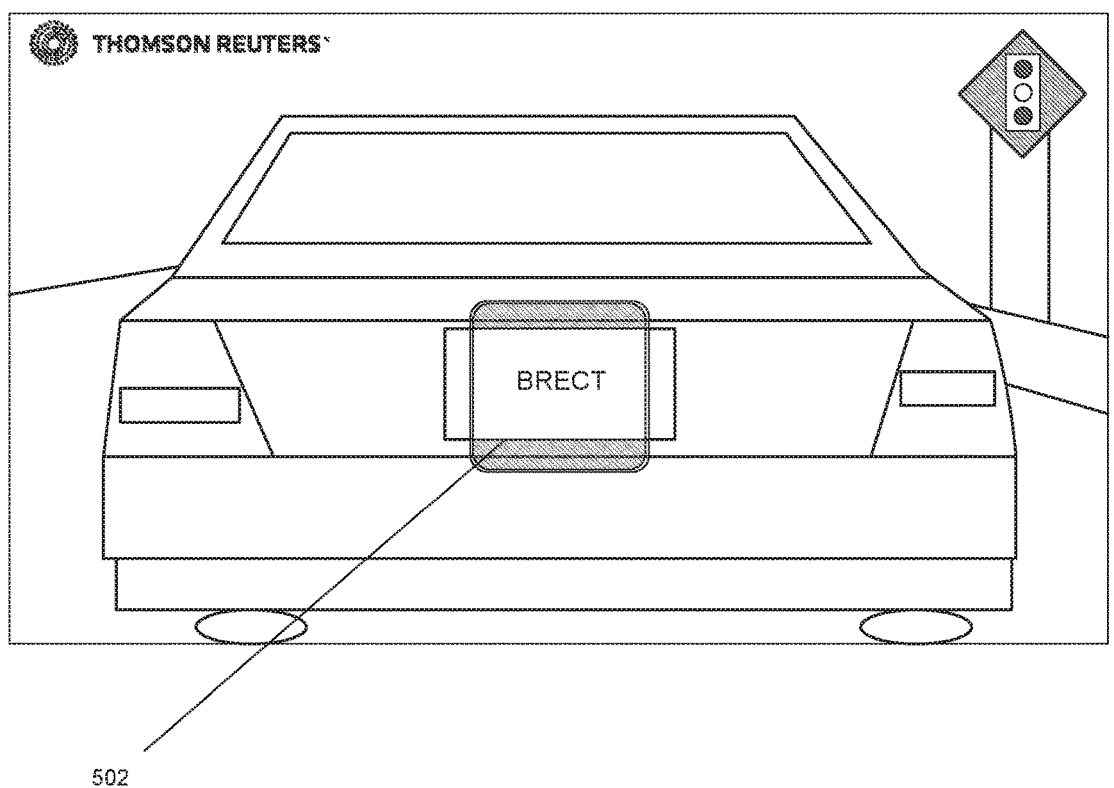
FIG. 5 is an illustration of another exemplary graphical user interface for public records database searching using a visual input through a mobile device.
Figure 6:
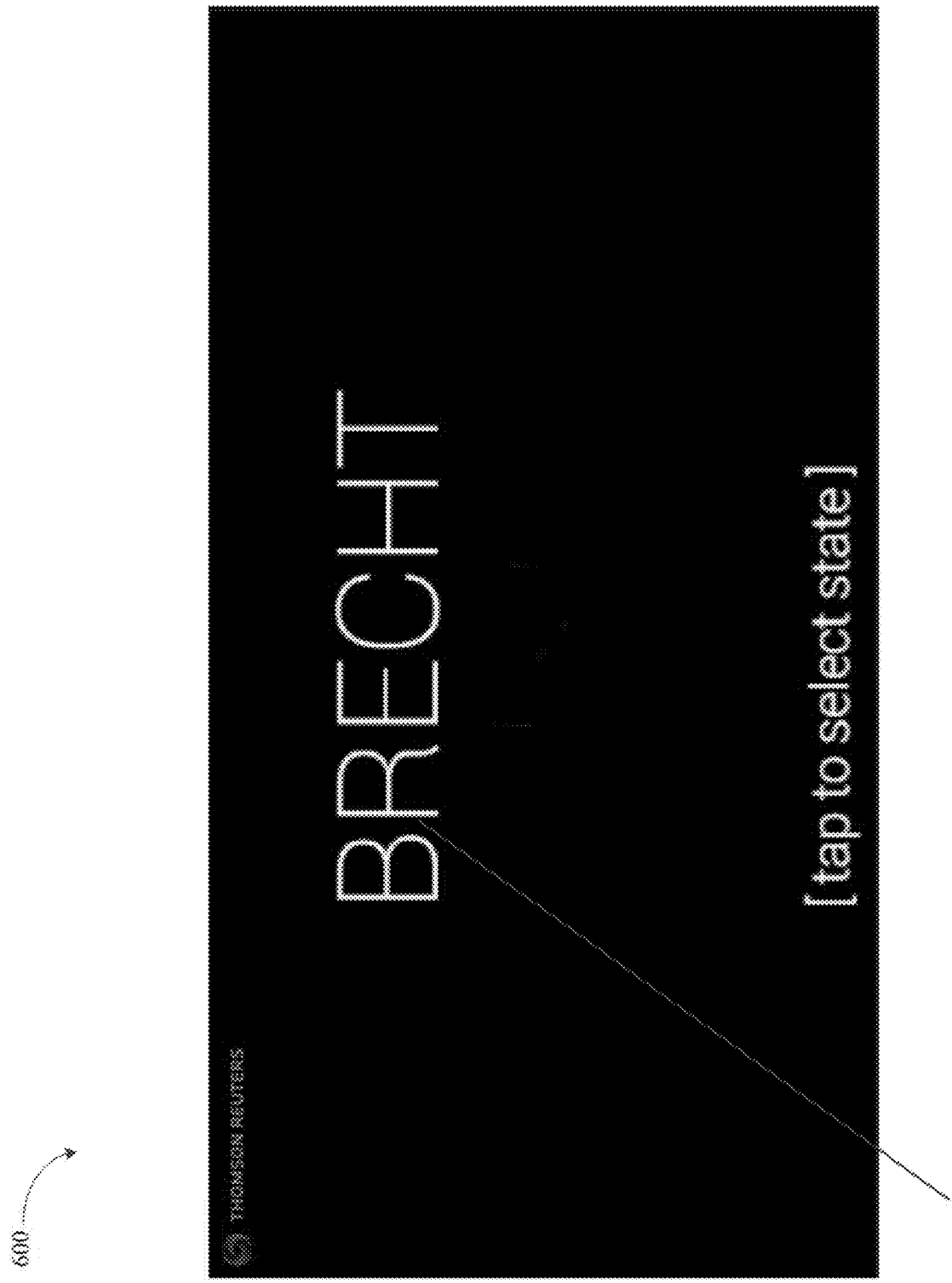
FIG. 6 is an illustration of another exemplary graphical user interface for public records database searching using a visual input through a mobile device.
Figure 7:
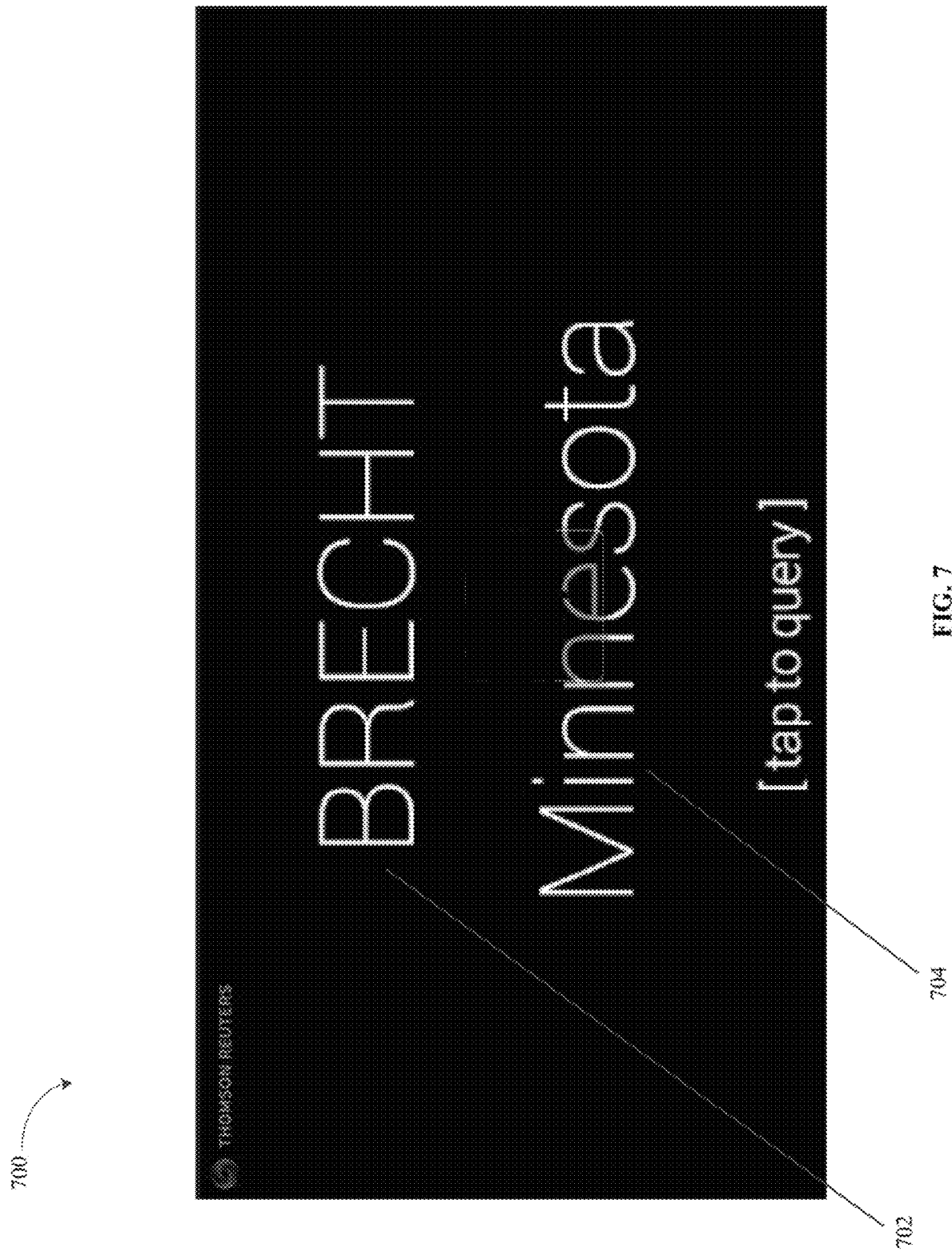
FIG. 7 is an illustration of another exemplary graphical user interface for public records database searching using a visual input through a mobile device.

FIG. 5 illustrates this activity whereby a still image 500 is captured including a vehicle's license plate number 502, in this case a vanity license plate that spells "BRECHT." Upon capture of the visual information, a personal device request signal is generated by the application module 162, which includes the visual information in the form of a still image of the vehicle license plate, and is transmitted to the transmission module 126 of the server device 110 over the network 170. The transmission module 126, in turn, stores the still image in the input data store 132 and notifies the application module 122 of its receipt. The application module 122 subsequently instructs the transmission module 126 to transmit a copy of the still image to the OCR server 150 for optical character recognition processing, which in turn identifies relevant textual information from the image still using processes known in the art, and transmits the processed textual information to the transmission module 126. According to another embodiment, optical character recognition processing is performed by the administrative module 122 itself. The transmission module 126, according to one embodiment, stores the processed textual information within the input data store 132, notifies the administrative module 122 of its receipt and transmits the processed textual information to the access device 160. FIG. 6 illustrates an exemplary graphical rendering 600 with the received processed textual information from a vehicle license plate. According to one embodiment, the user of the access device 160 receives the processed textual information in order to confirm its accuracy, as well as to include additional textual information, such as the State that issued the vehicle license plate. FIGS. 6 and 7 illustrate this activity wherein the user of the access device 160 is given the option to include tap and select a State and the user selects "Minnesota."

Figure 9:
FIG. 9 is an illustration of an exemplary graphical user interface for public records database searching using an audio input through a mobile device.
Figure 10:
FIG. 10 is an illustration of another exemplary graphical user interface for public records database searching using an audio input through a mobile device.
Figure 11:
FIG. 11 is an illustration of another exemplary graphical user interface for public records database searching using an audio input through a mobile device.

FIG. 9 presents an exemplary graphical rendering 900, in one embodiment, whereby the user elects to "run a plate" 902 by providing audio input by voice 904. According to one embodiment, the access device 160 comprises a microphone operative to capture audio as is known in the art at the instruction of the application module 162 which received the user selection "by voice" 904 through one or more voice commands, depression of one or more physical buttons or keys, or combination thereof. For example, the application having been initiated on the law enforcement officer's personal computing eyewear device and instructed to "run a plate" by a voice, will prompt the law enforcement officer to speak the state and plate number as illustrated in the graphical rendering 1000 of FIG. 10. The access device 160 then utilizes its incorporated microphone to capture the law enforcement officer's audible dictation of a vehicle's license plate. FIG. 11 illustrates this activity whereby the audible dictation of a vehicle license plate number and state are captured. Upon capture of the audio information, a personal device request signal is generated by the application module 162, which includes the audio information, which in turn is transmitted to the transmission module 126 of the server device 110 over the network 170. The transmission module 126, in turn, stores the still image in the input data store 132 and notifies the application module 122 of its receipt.

As set forth in the present embodiment, the personal device request signal may comprise audio and/or visual information. In another embodiment, the personal device request signal may personal device request signal comprise a combination of audio information, visual information and textual information, textual information comprising text entered by or selected from a pre-determined list by an end user via the user interface 166 of access device 160.

Returning to FIG. 2, according to one embodiment, in response to the receipt of the personal device request signal, the administrative module 122 identifies a first piece of information from a first public records database, step 220, and a second piece of information from a second public records database, step 230. It should be noted, however, that the present embodiment is not intended to be limited to solely two pieces of information identified from two public records databases but instead may identify multiple pieces of information from multiple public records databases.

According to one embodiment, the first and second public records databases are stored in one or more data stores maintained by the by the public records server 140. As set forth previously, an exemplary public records server 140 may include the server, storage media and other associated hardware to support the THOMSON REUTERS CLEAR®, records database product, which includes a collection of public and proprietary records databases comprising such information as extensive cell phone and work affiliations data, data from social networks, blogs, news and watch lists. The public records server 140, in one embodiment, is queried and searched by the administrative module 122 using the information contained within personal device request signal. More specifically, the administrative module 122 of the server device 110, having received a personal device request signal, performs a search of the multiple databases maintained within the public records server 140, using the audio, visual or textual information contained within the personal device request signal, in order to identify relevant information within each of the one more public records databases pertaining to an individual or entity. The administrative module 122 having been notified of the receipt of an audio input or textual input from the access device 160 or of processed textual input from the visual information processed by the OCR server 150, searches the multiple databases of the public records server 140. For example, the administrative module 122 having been notified that the processing of the vehicle license plate image yielded the processed textual information "BRECHT," performs a search on each of the States' motor vehicle registration databases maintained by the public records server 140 in order to identify the individual or entity the vehicle is registered to, as well as the vehicle's make and model and the address to which the vehicle is registered. The administrative module 122 then may search other databases maintained by the public records server 140, such as a State's motor vehicle licensed drive database to identify the date of birth of the registered owner of vehicle. In another example, administrative module 122 having been notified of the receipt of an audio input, such as the audible dictation of the state and plate number of a vehicle's license plate, uses natural language processing technology as is known in the art to convert the audio input to textual information and subsequently searches each of the States' motor vehicle registration databases maintained by the public records server 140 in order to identify the individual or entity the vehicle is registered to, and use the identified registered owner's name to subsequently search other databases, such as a State's motor vehicle licensed drive database in order to identify the date of birth of the registered owner of vehicle. In both examples, the identified information is transmitted to the server device 110 at the transmission server 126, which in turn stores the identified information in the reporting data store 134 and notifies the reporting module 124 of the receipt of the identified relevant information.

According to another embodiment, the administrative module 122 serves to transmit the personal device request signal in the form of visual information, audio information or textual information, or any combination thereof, to the public records server 140, which in turn searches its one or more public records databases in order to identify relevant information pertaining to an individual or entity, in which case all interaction with the OCR server 150 and natural language processing is performed by the public records server 140.

Figure 8:
FIG. 8 is an illustration of another exemplary report generated using a visual input through a mobile device.
Figure 12:
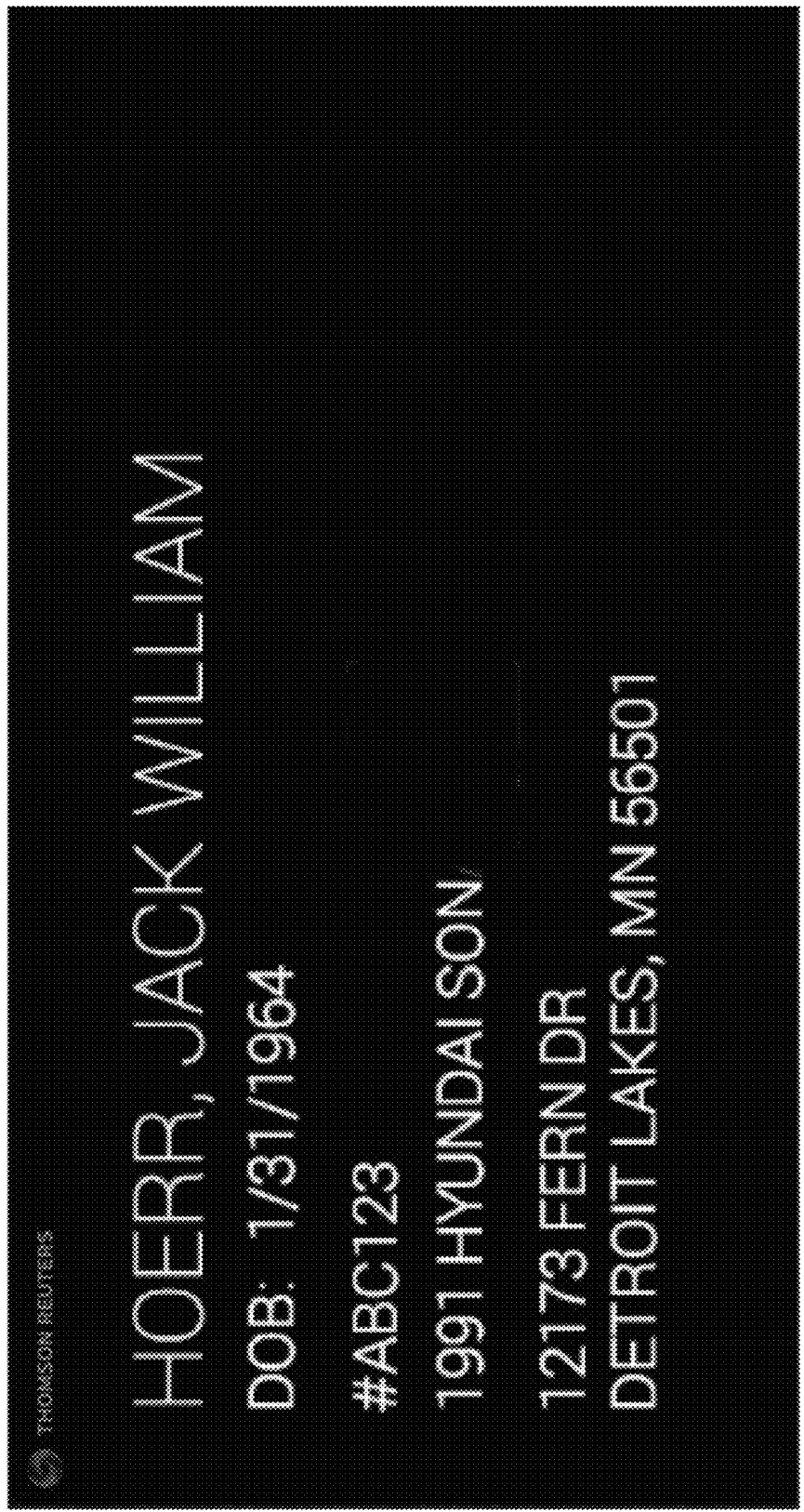
FIG. 12 is an illustration of another exemplary report generated using an audio input through a mobile device.

Returning to FIG. 2, at step 240, the reporting module 134 having been notified of the receipt of relevant information, generates a report associated with the first piece of information and the second piece of information. For example, the report may include the identity of the registered owner of the vehicle, the make and model of the vehicle, the address of the vehicle and the date of birth of the registered owner. The generated report is then stored in the reporting data store 134, along a report signal associated with the generated report, step 240. At step 250, the report signal representative of the generated report is transmitted to the access device 160 by the transmission module 126. FIGS. 8 and 12 illustrate exemplary generated reports that are transmitted to the personal device made rendered on the user interface 166.

According to one embodiment, in addition to multiple pieces of information, a generated report may include a determination that an individual is a "person of interest." According to one embodiment, a "person of interest" is an individual who is involved in or subject to a criminal investigation and either who has not been arrested or formally accused of a crime or who has been accused of the crime or found guilty of the crime and has outstanding warrants for the his arrest and capture. In one embodiment, the determination of a person of interest could be as simple as the administrative module identifying the person of interest from one or more government watch lists maintained by the public records server 140 based on the personal device request signal. In another embodiment, the determination of a person of interest could be made by the administrative module 122 based on mismatched information between multiple databases, such as differing residential addresses or dates of birth for a registered owner associated with the vehicle license plate. In such circumstances, differing dates of birth or residential addresses demonstrate some activity of identity wherein the different pieces of information are associated with different individuals, e.g. the identity thief and the person whose identity has been stolen, in which case the administrative module 122 would determine that one of the persons is a person of interest. In another embodiment, public records server 140 itself performs a determination of a person of interest and based on the search of its multiple databases using information received through the personal device request signal.

FIGS. 1 through 12 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A computer implemented method for performing an on-line database search comprising:
   receiving a personal device request signal from a personal device, wherein the personal device request signal comprises at least one of audio information and textual information extracted from visual information and is generated by an interaction between a law enforcement person and the personal device in an unsecured physical environment;
   in response to receipt of the personal device request signal:
      identifying a first piece of information from a first public records database; and
      identifying a second piece of information from a second public records database;
      generating a report associated with the first piece of information and the second piece of information, wherein the first piece of information relates to a first person, the second piece of information relates to a second person and the report comprises a determination that the first person is a person of interest, wherein a person of interest comprises an individual associated with a criminal activity, wherein said determination that the first person is a person of interest is based on a mismatch between the first piece of information and the second piece of information;
      storing a report signal associated with the report; and
      transmitting the report signal to the personal device.

2. The computer implemented method of claim 1 wherein the personal device is a wearable personal device and the interaction is at least one of a visual interaction, an audio interaction and textual information.

3. The computer implemented method of claim 2 wherein the wearable personal device is eyewear.

4. The computer implemented method of claim 2 wherein the wearable personal device comprises a microphone.

5. The computer implemented method of claim 2 wherein the wearable personal device comprises an image capture and process system.

6. The computer implemented method of claim 1 wherein the report associated with the first piece of information and the second piece of information comprises a determination that the first person is a person of interest.

7. Non-transitory computer readable media comprising program code stored thereon for execution by a programmable processor to perform a method for on-line database search, the computer readable media comprising:
   program code for receiving a personal device request signal from a personal device, wherein the personal device request signal comprises at least one of audio information and textual information extracted from visual information and is generated by an interaction between a law enforcement person and the personal device in an unsecured physical environment;
   program code for, in response to receipt of the personal device request signal,
      identifying a first piece of information from a first public records database, and
      identifying a second piece of information from a second public records database;
      generating a report associated with the first piece of information and the second piece of information, wherein the first piece of information relates to a first person, the second piece of information relates to a second person and the report comprises a determination that the first person is a person of interest, wherein a person of interest comprises an individual associated with a criminal activity, wherein said determination that the first person is a person of interest is based on a mismatch between the first piece of information and the second piece of information;
   program code for storing a report signal associated with the report; and program code for transmitting the report signal to the personal device.

8. The computer readable media of claim 7 wherein the personal device is a wearable personal device and the interaction is at least one of a visual interaction and an audio interaction.

9. The computer readable media of claim 8 wherein the wearable personal device is eyewear.

10. The computer readable media of claim 8 wherein the wearable personal device comprises a microphone.

11. The computer readable media of claim 8 wherein the wearable personal device comprises an image capture and process system.

12. The computer readable media of claim 7 wherein the report associated with the first piece of information and the second piece of information comprises a determination that the first person is a person of interest.

13. A system for performing an on-line database search comprising:
   a first server including a processor configured to:
      receive a personal device request signal from a personal device, wherein the personal device request signal comprises at least one of audio information and textual information extracted from visual information and is generated by an interaction between a law enforcement person and the personal device in an unsecured physical environment;
      in response to receipt of the personal device request signal,
         identify a first piece of information from a first public records database; and
         identify a second piece of information from a second public records database;
         generating a report associated with the first piece of information and the second piece of information, wherein the first piece of information relates to a first person, the second piece of information relates to a second person and the report comprises a determination that the first person is a person of interest, wherein a person of interest comprises an individual associated with a criminal activity, wherein said determination that the first person is a person of interest is based on a mismatch between the first piece of information and the second piece of information;

store a report signal associated with the report; and transmit the report signal to the personal device.

14. The system of claim 13 wherein the personal device is a wearable personal device and the interaction is at least one of a visual interaction and an audio interaction.

15. The system of claim 14 wherein the wearable personal device is eyewear.

16. The system of claim 14 wherein the wearable personal device comprises a microphone.

17. The system of claim 14 wherein the wearable personal device comprises an image capture and process system.

18. The system of claim 14 wherein the report associated with the first piece of information and the second piece of information comprises a determination that the first person is a person of interest.

* * * * *